(12) United States Patent  (10) Patent No.: US 7,860,337 B2
Zimmer  (45) Date of Patent: Dec. 28, 2010

(54) BLUR COMPUTATION ALGORITHM

(75) Inventor: Mark Zimmer, Aptos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 12/644,854

(22) Filed: Dec. 22, 2009

(65) Prior Publication Data

US 2010/0098350 A1  Apr. 22, 2010

Related U.S. Application Data

(63) Continuation of application No. 10/826,596, filed on Apr. 16, 2004, now Pat. No. 7,636,489.

(51) Int. Cl.
G06K 9/40  (2006.01)
(52) U.S. Cl. .................. 382/264; 382/254; 382/260; 382/265
(58) Field of Classification Search ............... 382/254, 382/260, 264, 265
See application file for complete search history.

(56) References Cited

U.S. PATENT DOCUMENTS

| 7,053,953 | B2* | 5/2006 | Belz et al. ............... 348/346 |
| 7,636,489 | B2* | 12/2009 | Zimmer ................... 382/264 |
| 2003/0087289 | A1* | 5/2003 | Zuzan et al. ............... 435/6 |
| 2003/0117511 | A1* | 6/2003 | Belz et al. ............. 348/333.11 |
| 2005/0057670 | A1* | 3/2005 | Tull et al. .................. 348/241 |
| 2005/0231502 | A1* | 10/2005 | Harper et al. ............. 345/418 |
| 2005/0231514 | A1* | 10/2005 | Harper et al. ............. 345/501 |
| 2005/0231521 | A1* | 10/2005 | Harper ..................... 345/582 |
| 2005/0235287 | A1* | 10/2005 | Harper ..................... 718/100 |
| 2006/0139369 | A1* | 6/2006 | Zimmer et al. ............ 345/611 |
| 2007/0206028 | A1* | 9/2007 | Zimmer et al. ............ 345/626 |
| 2008/0002904 | A1* | 1/2008 | Lyu et al. ................. 382/266 |
| 2008/0285825 | A1* | 11/2008 | Zhang et al. ............. 382/128 |
| 2010/0123784 | A1* | 5/2010 | Ding et al. ............... 348/189 |
| 2010/0183241 | A1* | 7/2010 | Lin et al. ................. 382/270 |

* cited by examiner

Primary Examiner—Bhavesh M Mehta
Assistant Examiner—Mia M Thomas
(74) Attorney, Agent, or Firm—Wong, Cabello, Lutsch, Rutherford & Brucculeri LLP

(57) ABSTRACT

Disclosed herein is an improved blur computation algorithm. The proposed algorithm accomplishes a blur of an image using fragment programs on a GPU. Alternatively, the blur may be computed on a CPU through emulation or directly programmed. Modifications of the program are possible that accomplish motion blur, zoom blur, radial blur, and various other forms of blur that vary across an image computed for the purpose of simulating depth-of-field.

26 Claims, 3 Drawing Sheets

| 1 | 1 |

Fig. 1A

| 1 | 2 | 1 |

Fig. 1B

| 1/4 | 1/2 | 1/4 |

Fig. 1C

| 1 | 4 | 6 | 4 | 1 |

Fig. 1D

| 1/16 | 1/4 | 3/8 | 1/4 | 1/16 |

| 1 | 0 | 4 | 0 | 6 | 0 | 4 | 0 | 1 |

Fig. 4

| 1 | 0 | 0 | 0 | 4 | 0 | 0 | 0 | 6 | 0 | 0 | 0 | 4 | 0 | 0 | 0 | 1 |

Fig. 5

BLUR COMPUTATION ALGORITHM

CROSS-REFERENCE TO RELATED APPLICATIONS

This Application is a continuation application which claims priority to co-pending U.S. patent application Ser. No. 10,826,596 filed 16 Apr. 2004, entitled "Improved Blur Computation Algorithm" and which is hereby incorporated by reference in its entirety.

BACKGROUND

The present invention is in the field of computer graphics processing. Particularly the present invention relates to techniques for increasing the efficiency of image-processing related computations. The invention described herein is particularly applicable to use in systems having a central processing unit (CPU) operating together with a dedicated graphics processing unit (GPU). Various implementations of such an architecture are described in assignee's patent applications: "System for Reducing the Number of Programs Necessary to Render an Image," by John Harper, Ser. No. 10/826,773; "System for Optimizing Graphics for Operations," by John Harper, Ralph Brunner, Peter Graffagnino, and Mark Zimmer, Ser. No. 10/825,694; "System for Emulating Graphics Operations," by John Harper, Ser. No. 10/826,744; and "High Level Program Interface for Graphics Operations," by John Harper, Ralph Brunner, Peter Graffagnino, and Mark Zimmer, Ser. No. 10/826,762, each filed 16 Apr. 2004 and incorporated herein by reference in its entirety. Although the methods and techniques described herein are particularly applicable to systems having a single CPU/single GPU architecture, there is no intent to restrict the invention to such systems. It is believed that the methods and techniques described herein may be advantageously applied in a variety of architectures.

In the object-oriented programming context of most modern graphics processing systems, there are generally four types of objects available to a programmer: images, filters, contexts, and vectors. An image is generally either the two dimensional result of rendering (a pixel image) or a representation of the same. A filter is generally high-level functions that are used to affect images. A context is a space, such as a defined place in memory where the result of a filtering operation resides. A vector is a collection of floating point numbers, for example, the four dimensional vector used to describe the appearance of a pixel (red, blue, green and transparency levels). Each of these definitions is somewhat exemplary in nature, and the foregoing definitions should not be considered exclusive or otherwise overly restrictive.

Most relevant to the purposes of the present invention are images and filters. In an embodiment of the present invention, filter-based image manipulation may be used in which the manipulation occurs on a programmable GPU. A relatively common filter applied to images is a blur. Various blurs exist and are used for shadow, the depiction of cinematic motion, defocusing, sharpening, rendering clean line art, detecting edges, and many professional photographic effects. A special blur is the Gaussian blur, which is a radially symmetric blur. Other, more complicated blurs and other convolution operations can often be separated into linear combinations of Gaussian blurs. Because the Gaussian blur is the cornerstone of many image processing algorithms, it is essential to have a fast way of computing it. It is even more desirable to have a way of computing a Gaussian blur that does not tie up the CPU in the calculation.

Modern programmable graphics processing units (GPUs) have reached a high level of programmability. GPU programs, called fragment programs, allow the programmer to directly compute an image by specifying the program that computes a single pixel of that image. This program is run in parallel by the GPU to produce the result image. To exactly compute a single pixel of Gaussian blur with any given radius it is technically necessary to apply a convolution over the entire source image. This is far too computationally intensive to implement. In practice, only approximations are calculated. To compute the approximation, it is important to use a minimum number of source image lookups (texture lookups). GPU fragment programs typically only allow a small maximum number of textures. Thus a scheme which minimizes the number of passes and maximizes the blurring work done with each pass is sought.

SUMMARY

The present invention relates to an improved blur computation algorithm. The proposed algorithm accomplishes a blur of an image using fragment programs on a GPU. Alternatively, the blur may be computed on a CPU through emulation or directly programmed. Modifications of the program are possible that accomplish motion blur, zoom blur, radial blur, and various other forms of blur that vary across an image computed for the purpose of simulating depth-of-field.

Hierarchical blur in fragment programs on GPUs is used to compute Gaussian blurs of images. Hierarchy means different blurs, spaced more or less evenly in the logarithm of the radius. The blur algorithm may be modified to do more or fewer lookups per step to achieve greater radius-varying continuity, resulting in levels and sublevels of hierarchy. The blur algorithm also features linear interpolation between hierarchical levels and sublevels to achieve even greater radius-varying continuity. Additional advantages of the blur algorithm include conceptually one-dimensional methods to achieve motion blur, zoom blur, and radial blur. Also described are functions that spatially interpolate between hierarchical levels and sublevels to achieve blurs that vary their character across an image.

In the object-oriented programming context of the present invention, there are generally four types of objects available to a programmer: images, filters, contexts, and vectors. An image is generally either the two dimensional result of rendering (a pixel image) or a representation of the same. A filter is generally high-level functions that are used to affect images. A context is a space, such as a defined place in memory where the result of a filtering operation resides. A vector is a collection of floating point numbers, for example, the four dimensional vector used to describe the appearance of a pixel (red, blue, green and transparency levels). Each of these definitions is somewhat exemplary in nature, and the foregoing definitions should not be considered exclusive or otherwise overly restrictive.

Most relevant to the purposes of the present invention are images and filters. In an embodiment of the present invention, filter-based image manipulation may be used in which the manipulation occurs on a programmable GPU.

BRIEF DESCRIPTION OF THE DRAWINGS

FIGS. 1A-E illustrate a plurality of functions employed in a digital convolution filter for computing a blur in accordance with the present invention.

FIG. 2 illustrates diagrammatically an input image of a blur filter computed in accordance with the present invention.

FIG. 3 illustrates diagrammatically and output image of a blur filter computed in accordance with the present invention.

FIG. 4 illustrates a spaced function, which diagrammatically represents a second order primary kernel employed in a digital convolution filter for computing a blur in accordance with the present invention.

FIG. 5 illustrates a spaced function, which diagrammatically represents a third order primary kernel employed in a digital convolution filter for computing a blur in accordance with the present invention.

DETAILED DESCRIPTION

Figure 6:
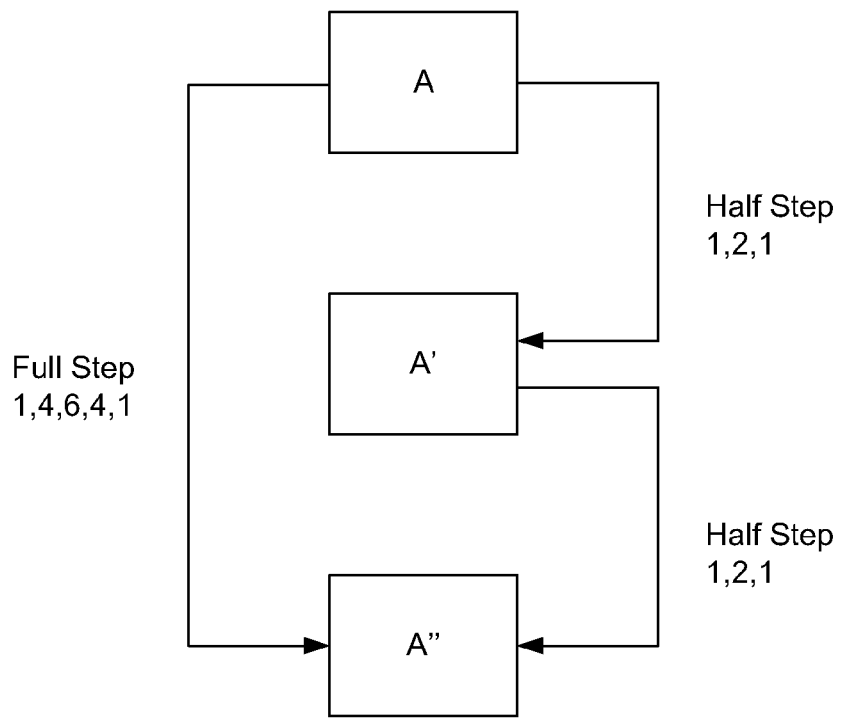
FIG. 6 illustrates the relationship between a source image, an image obtained by applying a half convolution step, and an image obtained by applying two half convolution steps or a full convolution step.

An improved blur computation algorithm is described herein. The following embodiments of the invention, described in terms of applications compatible with computer systems manufactured by Apple Computer, Inc. of Cupertino, Calif., are illustrative only and should not be considered limiting in any respect.

A blur is a filter that may be applied to an image. At its most basic level, a blur is simply a convolution. Referring to FIG. 1A, a basic blur function is illustrated, which is the smallest box blur. This is also known as a minimum blur. Convolved with itself, this yields the blur illustrated in FIG. 1B. The function may be normalized (i.e., reduced to unit gain), and the normalized version of the blur function of FIG. 1B is illustrated in FIG. 1C. If this resultant function is convolved with itself, the blur function illustrated in FIG. 1D results. The functions may be normalized (i.e., reduced to unit gain), and the normalized version of the blur function of FIG. 1D is illustrated in FIG. 1E. As can be seen from FIGS. 1A-1E, each subsequent convolution operation increases the width (and thus the standard deviation) of the function.

As an example, suppose that the blur of FIG. 1E were to be applied to the image illustrated schematically in FIG. 2, with the result being the image illustrated schematically in FIG. 3. Note that this example illustrates only a horizontal pass. The images in FIGS. 2 and 3 are made up of pixels arranged into n rows and m columns. Each pixel has a value, which may, for example, be a vector value that specifies color (in red, green, and blue components) and transparency. Each pixel in the output image (FIG. 3) is computed as a weighted average of the values of the corresponding pixel and a predetermined number of surrounding pixels in the input image (FIG. 2). For example, pixel X has a value of $1/16*A+1/4*B+3/8*C+1/4*D+1/16*E$. For reasons of computational efficiency, described in greater detail in the incorporated references, it is advantageous to create a GPU fragment program corresponding to each of the various convolutions. Thus a GPU fragment program might be created to perform the convolution of FIG. 1B, and a separate GPU fragment program might be created to perform the convolution of FIG. 1D.

As described in more detail below, by multiple applications of the repeated convolution described with reference to FIGS. 1A-1E, it is possible to obtain a blur that approximates a Gaussian blur. A Gaussian blur is radially symmetric, and is dimensionally separable. Thus the blur may be performed first in the horizontal direction with the vertical blur being performed on the result or vice versa.

When specifying a Gaussian blur, the key parameter is the blur radius. The blur radius is the standard deviation of the Gaussian distribution convolved with the image to produce the blur. As can be seen from FIGS. 1A-1E, the higher standard deviation functions (i.e., higher blur radii) require a greater number of samples to compute a particular pixel value. For example, the blur of FIG. 1B requires three samples from the source image, while the blur of FIG. 1D requires five samples. Thus creating ever higher ordered convolution functions becomes so computationally intensive as to be extravagant and inefficient. Additionally, it requires the creation of an undue multiplicity of fragment programs to account for the higher blur radii.

However, the inventor has discovered that an improved blur may be computed using the function of FIG. 1D as a basis. For purposes of the following description, the coefficients of FIG. 1D are referenced, although in a practical implementation, the normalized coefficients of FIG. 1E are used. A GPU fragment program is preferably used to implement the convolution of this function, and this fragment program will be referred to as first kernel or K1. The inventor has discovered blurs for higher radii may be computed using the first kernel with different coefficient spacing, for example as illustrated in FIGS. 4 and 5. These expanded functions have larger variances (and thus larger standard deviations and blur radii), yet still require only five samples from the original image. This implementation advantageously allows the same fragment program to be used, the only change is the loop variable (sample spacing), which increases with each step in accordance with $2^{n-1}$. Thus the second order kernel (K2) is illustrated in FIG. 4 (sample spacing is $2^{2-1}=2$). Similarly the third order kernel (K3) is illustrated in FIG. 5 (spacing is $2^{3-1}=4$).

The variance of the original image, unconvolved, is $1/12$. The variance of K1 (the normalized version) is $1/3$. As is well known from basic probability theory, the variance of a distribution is equal to the square of the standard deviation of the distribution, which is also the blur radius. K2 has a variance of $4/3$, and K3 has a variance of $16/3$, thus corresponding to higher blur radii. However, it will be appreciated that with each step, the blur radius (standard deviation) doubles. Thus the variance quadruples with each step.

The variance of the first intermediate result after applying K1 to the original (unconvolved) image is $1/12+1/3$. The variance of the second intermediate result after applying K2 to the first intermediate result is $1/12+1/3+4/3$, and so forth. The actual blur radius (standard deviation) of the first intermediate result is $\text{sqrt}(1/12+1/3)$=approximately 0.6455. The actual blur radius (standard deviation) of the second intermediate result is $\text{sqrt}(1/12+1/3+4/3)$=approximately 1.3229.

Unfortunately, doubling the blur radius with each step leads to an undesirable "popping" between increasing blur radii, i.e., with each step increase in blur radius the algorithm must double the blur radius. Thus the inventor has discovered that half steps may be computed for blur radii between the primary steps (kernels) and the result may be interpolated to approximate a blur for the desired radius.

Thus, assuming that a user has selected a desired blur radius $R_d$, $f(R_d)$ gives the number of convolution passes required and the number of interpolations required. The source code to determine the number of passes and interpolations required is included as Appendix A. Interpolation is required because often the desired radius $R_d$ will lie between two different results of a full convolution. The interpolation fraction specifies where between the two results so that the results may be interpolated to get the desired $R_d$.

The interpolation technique is illustrated more generally in FIG. 6. A beginning image A is illustrated. A full step, a doubling of the blur radius, will produce the image A". A half step, equivalent to multiplying the blur radius by √2 (approx 1.4) will produce the image A'. A second half step performed on the image A' will also produce the image A". Assuming the desired blur radius lies between image A and image A', only the first half step is computed, and the interpolation is performed. If the desired result lies between image A' and image A", it is necessary to compute the first half step (image A') and the second half step (image A") and the desired result is obtained by interpolation of these two results. This process is also generally illustrated by the flowchart in FIG. 7.

The half step function, which is also preferably implemented in its own GPU fragment program known as a secondary kernel (S1) performs a convolution of the image with the function illustrated in FIG. 1B (although normalized). For half steps of higher orders, the same secondary kernel is used, but with coefficient spacing increasing on the same order and corresponding to the primary kernel, i.e., $2^{n-1}$.

Figure 7:
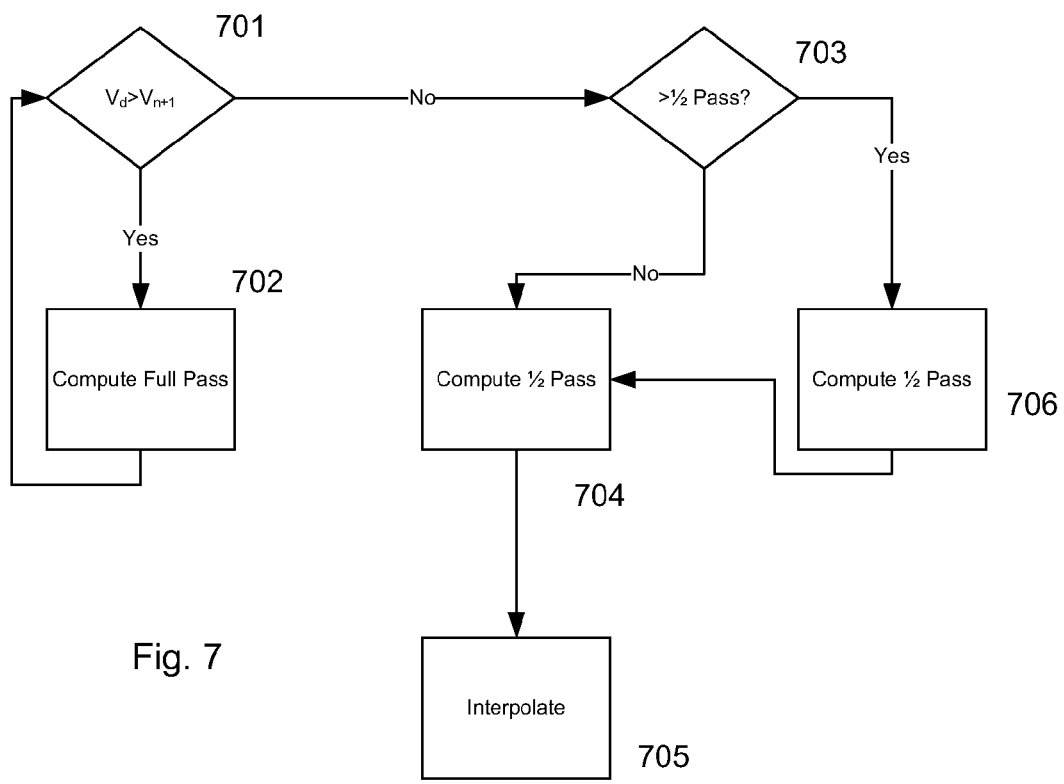
FIG. 7 is a flowchart illustrating a blur process in accordance with the present invention.

So, referring back to the flow chart in FIG. 7, the desired variance $V_d$ is computed as the square of the desired blur radius Rd. The program flow enters decision box 701. At this point it is determined whether the desired variance required is greater than the cumulated variance after completion of the next step. If it is, meaning that more than one full step will be required, the next full pass is computed at step 702. The flow then returns to decision box 701. If the desired variance required is not greater than the cumulated variance after completion of the next step, control passes to decision box 703.

At decision box 703, it is determined whether the desired variance is greater than the cumulated variance after completion of a half pass. If it is not, a single half pass is computed (step 704), and the results of the half pass are interpolated with the prior result (step 705). If the desired variance is greater than the cumulated variance after completion of a single half pass, it is necessary to compute two half passes (steps 706 and 704). The result is then determined by interpolation (step 705) between the results of the two half passes. Although the result of the two half passes is the same as the result of a full pass, it is computationally more efficient to compute the second half pass rather than an additional full pass. This is because the second half pass is performed on the result of the first half pass, while the full pass would require the same source image as the first half pass. Thus fewer memory read/writes are required to perform two half passes than to perform a half pass and a full pass. Similarly, the fragment program to compute the half pass is already available, whereas a memory read/write would be necessary to retrieve the primary kernel to compute a full pass.

As described, only a single interpolation step is described. However, if desired, greater levels of radius-varying continuity could be achieved by achieving additional levels of interpolation, for example using a tertiary step or kernel using a lower order convolution. Additionally, the algorithm may be modified by one of ordinary skill in the art to perform more or fewer lookups per step to achieve greater radius-varying continuity, resulting in levels and sublevels of hierarchy.

Figure 8:
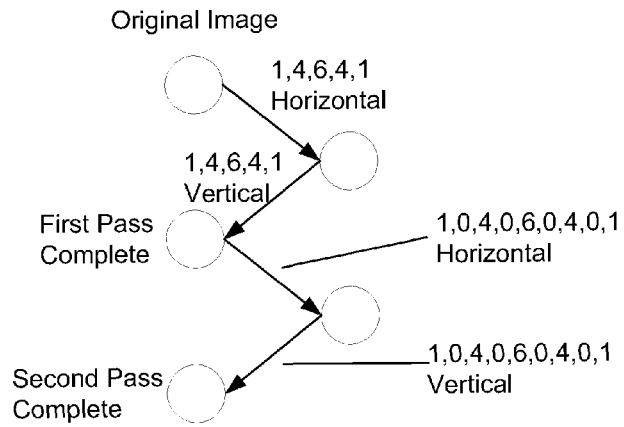
FIG. 8 is a tree diagram illustrating a Gaussian blur computed using a process in accordance with the present invention.
Figure 8:
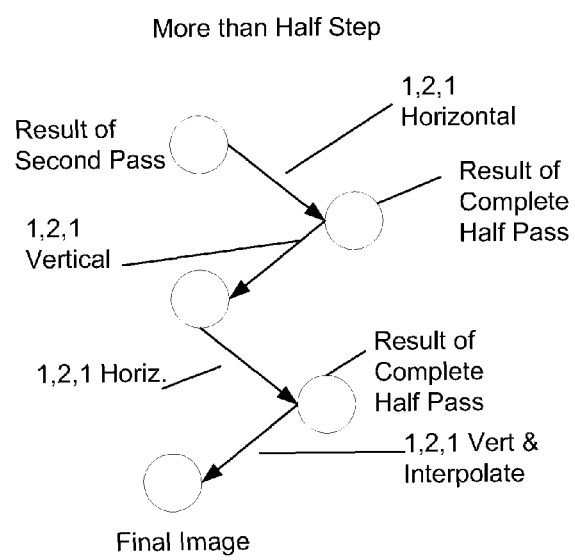
Figure 8:
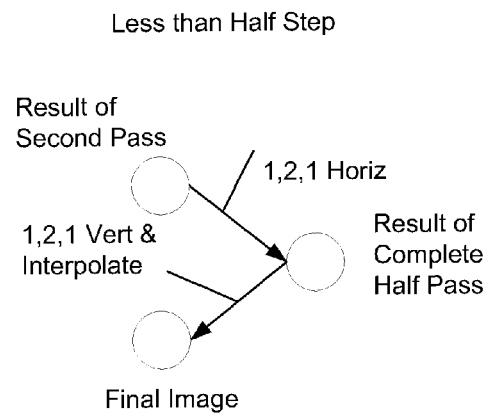

As noted, the Gaussian blur is radially symmetric and axis-separable, thus each of these steps is performed for each axis of the image. A complete process diagram of a Gaussian blur is illustrated in FIG. 8. As can be seen from FIG. 8, the specified blur radius required more than two complete passes and less than three complete passes. Thus the primary kernel is executed on the original image in the horizontal direction. The primary kernel (K1) is then executed on the intermediate result in the vertical direction to complete the first pass. The second pass comprises execution of the primary kernel having a coefficient spacing of two (K2) in the horizontal direction, with the same kernel executed in the vertical direction on the intermediate result to complete the second pass.

Assuming the blur radius is less than a half step more than two full passes, the right hand branch is followed, wherein the secondary kernel is applied horizontally to the result of the second pass to produce an intermediate result. The secondary kernel is then applied vertically to this intermediate result to produce the result of the complete half pass. The final image is then determined by interpolation between the result of the second pass and the result of the complete half pass. If the desired blur radius is more than a half step more than two full passes, the left hand branch is followed. In this branch, two half steps are computed, with the final result again determined by interpolation.

Additionally, the algorithm may be modified to achieve blur effects other than a Gaussian blur. It may also be used advantageously to achieve conceptually one-dimensional blurs such as motion blur, zoom blur, radial blur, spiral blur, and others. For these blurs, a full pass consists of a single kernel rather than a horizontal and a vertical kernel.

For motion blur, the sample-to-sample spacing is a two-dimensional subpixel-accurate displacement representing an angular offset from the destination sample position. The higher-order kernels use this spacing times 2n-1.

For zoom blur, the sample locations are computed in a different manner. First a vector v is computed, which is a two-dimensional subpixel-accurate displacement representing the specific offset from the center of the zoom blur to the destination sample position. A fraction f, typically close to but not equal to 1 (e.g. 0.98), is used to compute the sample positions. The sample positions are at locations equal to the center of the zoom blur plus v times the following five factors: f-2, f-1, 1, f, f2. The fraction f can be changed to compute more or less accurate zoom blurs.

For radial blur, the sample locations are computed in another manner. First a vector v is computed, which is a two-dimensional subpixel-accurate displacement representing the specific offset from the center of the zoom blur to the destination sample position. An angle a, typically close to 0 degrees (e.g. 0.25 degrees), is used to compute the sample positions. The sample positions are at locations equal to the center of the zoom blur plus v rotated by the following angles: −2*a, −a, 0, a, 2*a. The angle a can be changed to compute more or less accurate radial blurs.

For spiral blurs, the sample locations are computed using a composition of the multiplication used in zoom blur and the angular rotation used in radial blur.

Gaussian blur may also modified to produce sharpening, highpass, and other striking photographic effects.

While the invention has been disclosed with respect to a limited number of embodiments, numerous modifications and variations will be appreciated by those skilled in the art. It is intended that all such variations and modifications fall with in the scope of the following claims.

APPENDIX A

```
static void
radius_to_npasses_blur (float radius, int passesPerStep, int *pnpasses,
int *plastpassnpasses, float *pinterp)
{
int npasses, pass, lastpassnpasses;
float interp, variance, midvariance, lastvariance, passvariance, delta;
variance = radius * radius;
pass = 0;
lastvariance = 1.0f / 12.0f; /* variance for unit convolution */
delta = 1.0f;
```

APPENDIX A-continued

```
/* compute next pass' variance (for pass 1) */
passvariance = lastvariance + delta;
while (variance > passvariance)
{
pass++;
lastvariance = passvariance;
delta = delta * 4.0f;
passvariance = lastvariance + delta;
}
/* use small (121) passes at the end to increase accuracy */
midvariance = (lastvariance + passvariance) * .5f;
lastpassnpasses = (variance <= midvariance) ? 1 : 2;
if (pass == 0)
{
npasses = passesPerStep;
if (lastpassnpasses == 1)
interp = variance / midvariance;
else
interp = (variance − midvariance) / (passvariance − midvariance);
}
else
{
npasses = (pass + 1) * passesPerStep;
if (lastpassnpasses == 1)
interp = (variance − lastvariance) / (midvariance − lastvariance);
else
interp = (variance − midvariance) / (passvariance − midvariance);
}
*pnpasses = npasses;
*plastpassnpasses = lastpassnpasses;
*pinterp = interp;
}
```

I claim:

1. A processing unit programmed to perform a method of applying a blur to an initial image, the method comprising the following acts:
    define a primary kernel to compute an output pixel as a weighted average of a plurality of pixels of the initial image wherein a spatial relationship between the output pixel and the plurality of pixels is determined by a step size of the primary kernel;
    apply the primary kernel, in a first full step, to each pixel of the initial image to produce an intermediate result;
    increase the step size of the primary kernel to create a higher order primary kernel and apply the higher order primary kernel, in a second full step, to each pixel in the intermediate result to produce a result image.

2. The processing unit of claim 1 further programmed to perform the acts of:
    define a secondary kernel to compute an output pixel as a weighted average of a plurality of pixels of the result image wherein a spatial relationship between the output pixel and the plurality of pixels is determined by a step size of the secondary kernel and wherein the weighted average of the secondary kernel is different from the weighted average of the primary kernel;
    apply the secondary kernel, in a first half step, to each pixel of the result image to produce a second intermediate result.

3. The processing unit of claim 2 further programmed to perform the act of:
    determine a final result by interpolating between each pixel in the result image and each corresponding pixel in the second intermediate result.

4. The processing unit of claim 2 further programmed to perform the acts of:
    apply the secondary kernel, in a second half step, to each pixel of the second intermediate result to produce a third intermediate result; and
    determine a final result by interpolating between each pixel in the second intermediate result and each corresponding pixel in the third intermediate result.

5. The processing unit of claim 4 wherein the half steps are performed by a plurality of GPU fragment programs.

6. The processing unit of claim 1 wherein the step size is further increased to create a successively higher order primary kernel and the successively higher order primary kernel is applied to a previous intermediate result to produce a next intermediate result until a predetermined step size limit is reached.

7. The processing unit of claim 1 wherein the blur applied to the initial image comprises a Gaussian blur computed by performing each full step in a horizontal direction and in a vertical direction.

8. The processing unit of claim 1 wherein the blur applied to the initial image comprises a blur selected from the group consisting of: a motion blur, a zoom blur, a radial blur, and a spatially dependent blur.

9. The processing unit of claim 1 wherein the full steps are performed by a plurality of GPU fragment programs.

10. The processing unit of claim 1 wherein the increase of the step size is computed proportional to a constant factor raised to a power determined by a current kernel application step number.

11. The processing unit of claim 10 wherein the current kernel application step number is applied horizontally in even subpasses and vertically in odd subpasses.

12. A method of applying a blur to an initial image using a processor to perform the acts of:
    defining a secondary kernel to compute an output pixel as a weighted average of a plurality of pixels of the initial image wherein a spatial relationship between the output pixel and the plurality of pixels is determined by a half step size of a primary kernel;
    applying the secondary kernel, in a first half step, to each pixel of the initial image to produce an intermediate result; and
    producing a result image by interpolating between each pixel in the initial image and each corresponding pixel in the intermediate result.

13. The method of claim 12 further comprising:
    applying the secondary kernel, in a second half step, to each pixel of the intermediate result to produce a second intermediate result; and
    producing a result image by interpolating between each pixel in the intermediate result and each corresponding pixel in the second intermediate result.

14. The method of claim 12 wherein the blur applied to the initial image comprises a Gaussian blur computed by applying the secondary kernel in each half step in a horizontal direction and in a vertical direction.

15. The method of claim 12 wherein the blur applied to the initial image comprises a blur selected from the group consisting of: a motion blur, a zoom blur, a radial blur, and a spatially dependent blur.

16. The method of claim 12 wherein the half steps are performed by a plurality of GPU fragment programs.

17. A processing unit programmed to perform a method of applying a blur to an initial image, the method comprising the following acts:
    define a secondary kernel to compute an output pixel as a weighted average of a plurality of pixels of the initial image wherein a spatial relationship between the output pixel and the plurality of pixels is determined by a half step size of a primary kernel;

apply the secondary kernel, in a first half step, to each pixel of the initial image to produce an intermediate result; and produce a result image by interpolating between each pixel in the initial image and each corresponding pixel in the intermediate result.

18. The processing unit of claim 17 further configured to perform the following acts:

apply the secondary kernel, in a second half step, to each pixel of the intermediate result image to produce a second intermediate result; and produce a final image by interpolating between each pixel in the result image and each corresponding pixel in the second intermediate result.

19. The processing unit of claim 17 wherein the blur applied to the initial image comprises a Gaussian blur computed by performing each half step in a horizontal direction and in a vertical direction.

20. The processing unit of claim 17 wherein the blur applied to the initial image comprises a blur selected from the group consisting of: a motion blur, a zoom blur, a radial blur, and a spatially dependent blur.

21. The processing unit of claim 17 wherein the half steps are performed by a plurality of GPU fragment programs.

22. A computer readable storage medium having embodied thereupon instructions executable by a computer to perform a method of applying a blur to an initial image, the instructions comprising:

defining a secondary kernel to compute an output pixel as a weighted average of a plurality of pixels of the initial image wherein a spatial relationship between the output pixel and the plurality of pixels is determined by a half step size of a primary kernel;

applying the secondary kernel, in a first half step, to each pixel of the initial image to produce an intermediate result; and producing a result image by interpolating between each pixel in the initial image and each corresponding pixel in the intermediate result.

23. The computer readable storage medium of claim 22, wherein the instructions executable by a computer further comprise instructions for:

applying the secondary kernel, in a second half step, to each pixel of the intermediate result image to produce a second intermediate result; and producing a final image by interpolating between each pixel in the result image and each corresponding pixel in the second intermediate result.

24. The computer readable storage medium of claim 22 wherein the blur applied to the initial image comprises a Gaussian blur computed by performing each half step in a horizontal direction and in a vertical direction.

25. The computer readable storage medium of claim 22 wherein the blur applied to the initial image comprises a blur selected from the group consisting of: a motion blur, a zoom blur, a radial blur, and a spatially dependent blur.

26. The computer readable storage medium of claim 22 wherein the half steps are performed by a plurality of GPU fragment programs.

\* \* \* \* \*

UNITED STATES PATENT AND TRADEMARK OFFICE
CERTIFICATE OF CORRECTION

| | | |
|---|---|---|
| PATENT NO. | : 7,860,337 B2 | |
| APPLICATION NO. | : 12/644854 | |
| DATED | : December 28, 2010 | |
| INVENTOR(S) | : Mark Zimmer | |

It is certified that error appears in the above-identified patent and that said Letters Patent is hereby corrected as shown below:

In column 6, line 25, delete "2n-1." and insert -- $2^{n-1}$. --, therefor.

Signed and Sealed this
First Day of November, 2011

David J. Kappos
*Director of the United States Patent and Trademark Office*